(12) United States Patent
Voolapalli et al.

(10) Patent No.: US 8,927,611 B2
(45) Date of Patent: Jan. 6, 2015

(54) COUNTER-CURRENT MULTISTAGE FISCHER TROPSCH REACTOR SYSTEMS

(75) Inventors: Ravi Kumar Voolapalli, Greater Noida (IN); Pranab Kumar Rakshit, Greater Noida (IN); Venkateswarlu Choudary Nettem, Greater Noida (IN); Mohammad Amir Siddiqui, Greater Noida (IN)

(73) Assignee: Bharat Petroleum Corporation Limited, Mumbai (IN)

( * ) Notice: Subject to any disclaimer, the term of this patent is extended or adjusted under 35 U.S.C. 154(b) by 642 days.

(21) Appl. No.: 13/256,742

(22) PCT Filed: Dec. 30, 2009

(86) PCT No.: PCT/IN2009/000755
§ 371 (c)(1),
(2), (4) Date: Dec. 2, 2011

(87) PCT Pub. No.: WO2010/106547
PCT Pub. Date: Sep. 23, 2010

(65) Prior Publication Data
US 2012/0071572 A1    Mar. 22, 2012

(30) Foreign Application Priority Data
Mar. 20, 2009    (IN) ............................ 639/MUM/2009

(51) Int. Cl.
*C07C 27/00*    (2006.01)
*C10G 2/00*    (2006.01)
(52) U.S. Cl.
CPC ......... *C10G 2/30* (2013.01); *B01J 2219/00006* (2013.01); *B01J 2219/0004* (2013.01)
USPC ........................................ 518/706; 518/700

(58) Field of Classification Search
CPC .................................... C10G 2/30; C10G 2/32
USPC .................................................. 518/700, 706
See application file for complete search history.

(56) References Cited

U.S. PATENT DOCUMENTS

| | | | | |
|---|---|---|---|---|
| 5,827,902 A | * | 10/1998 | Maretto et al. | ................ 518/706 |
| 6,156,809 A | | 12/2000 | Clark et al. | |
| 6,211,255 B1 | * | 4/2001 | Schanke et al. | ............... 518/715 |
| 2005/0282918 A1 | | 12/2005 | Bowe | |

OTHER PUBLICATIONS

"The Fischer-Tropsch Synthesis—Chapter 7", "Part 1: Oil from Coal" In: Bureau of Mines Bituminous Coal Staff: "The Bureau of Mines Synthetic Liquid Fuels Program, 1944-1950—Report of Investigations 5506" Dec. 31, 1959 , United States Government Printing Office, Washington D.C, U.S.A , XP002590531, pp. 149-157—p. 155, line 22-line 24.
Bureau of Mines: "Annual report of Research and Technologic Work on Coal—Fiscal Year 1946—Information Circular 7417" Jul. 31, 1947, United States Department of the Interior, Washington D.C, U.S.A, XP002590532 , pp. 126-133 p. 126-p. 127, line 8-line 21.

* cited by examiner

*Primary Examiner* — Jafar Parsa
(74) *Attorney, Agent, or Firm* — Ladas & Parry LLP

(57) ABSTRACT

The invention discloses an improved multistage fischer tropsch process scheme for the production of hydrocarbon fuels comprising feeding gaseous phase syngas and liquid stream hydrocarbons in a counter current manner such as herein described into the reaction vessel at a number of stages containing reaction catalysts; wherein fresh syngas enters into the stage where the product liquid stream leaves and the fresh liquid stream enters into the stage where the unreacted syngas leaves; wherein further the temperature of each stage can be controlled independently. More particularly the invention relates to improving the heat release in different reactors, product selectivity and reactor productivity of FT reactors.

9 Claims, 3 Drawing Sheets

FIGURE 1
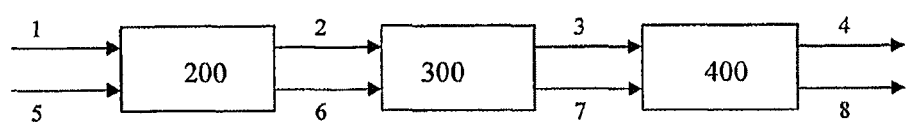
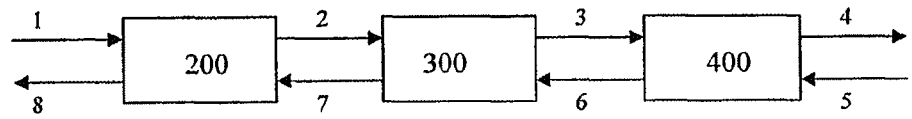
FIGURE 2

FIGURE 3
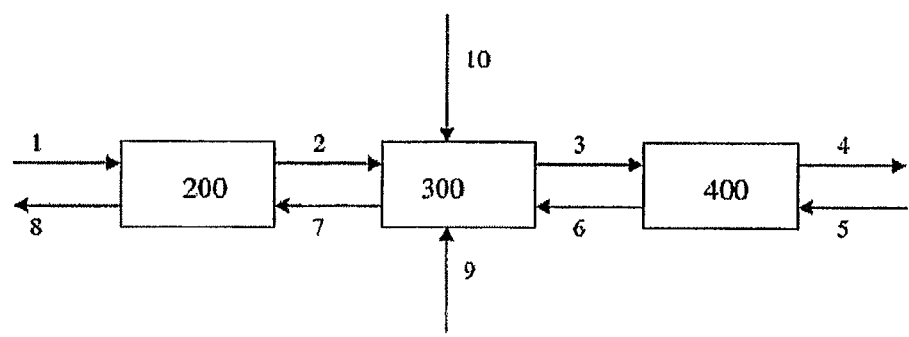
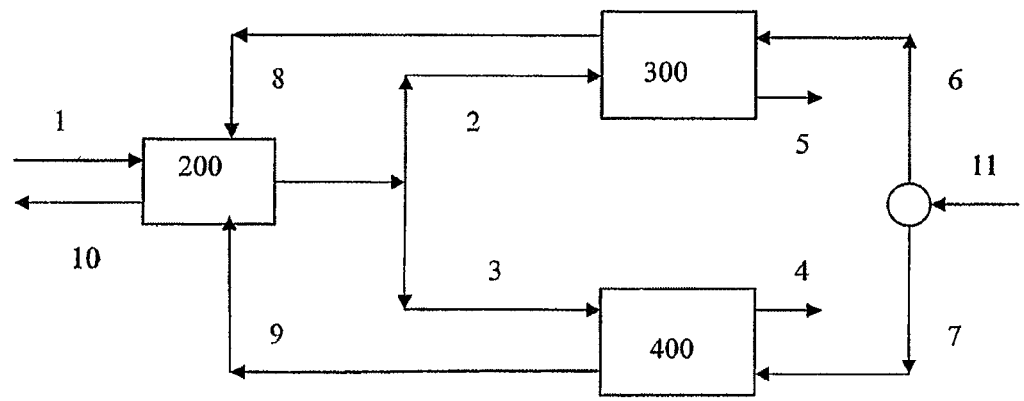
FIGURE 4

COUNTER-CURRENT MULTISTAGE FISCHER TROPSCH REACTOR SYSTEMS

FIELD OF THE INVENTION

The present invention relates to the processes based on Fisher Tropsch reaction for producing hydrocarbon fuels from synthesis gas, i.e. a mixture of carbon monoxide and hydrogen. More particularly, relates to a new Fisher Tropsch process scheme and configuration for improving the heat release and distribution in different reactors, product selectivity and reactor productivity.

BACKGROUND AND PRIOR ART OF THE INVENTION

Production of long chain hydrocarbon molecules through Fisher Tropsch (hereinafter also referred to as "FT") reaction is well known for more than fifty years and commercially being practiced in quite a few places. Recently there has been renewed interest due to volatility in crude prices and consequent emphasis on more profitable use of huge coal and gas reserves. Iron or cobalt catalysts are typically used for converting CO, $H_2$ rich synthesis gas into liquid fuels in fixed or slurry bubble column reactors. Much of the early work has focused on fixed bed reactor systems. However, recent trend has been to use slurry bubble column reactors due to relative ease of handling huge exothermic heat of reaction from FT reactions.

Slurry bubble column reactors (SBCR) operate with catalyst particles suspended in liquid phase, while the synthesis gas is sparged at high pressure from the bottom of the reactor. Due to concentration driving force, the reactor liquid absorbs the gas from the rising gas bubbles and FT reactions occur over the suspended catalyst particles producing both gas and liquid hydrocarbons. Depending on the partial pressure of the hydrocarbons the product molecules remain either in liquid or gas phase. The key advantages of SBCR system includes excellent heat transfer performance, online catalyst addition and removal, and reasonable inter phase mass transfer rates with low energy input.

Several studies focused on improving the SBCR designs for improving the reactor productivity and selectivity. In U.S. Pat. No. 7,019,038, a method for reducing the molecular Weight of liquid hydrocarbon through recycling a portion of lower molecular weight hydrocarbon product was disclosed. It was expected that by lowering the molecular catalyst site, thus improving the conversions. Similarly, U.S. Pat. No. 6,897,246 suggests the locations for recycling olefins streams in a multi stage reactor system for improved light olefin conversion. U.S. Pat. No. 5,827,902, suggests a FT reactor configuration with more than two slurry reactors in series or placing baffles inside the reactor for achieving plug flow contacting pattern and improving reactor productivity. The benefits envisaged through this system was higher overall feed conversions and less recycle requirement.

Although multi stage configurations aid in improving the reactant conversion, the conversion in each stage is different and hence requires different heat transfer area for absorbing the heat. This results in major differences in reactor sizes due to non-uniform heat exchanger sizing. Uniform size reactors are preferred from maintenance and cost perspective. Similarly, Olefins produced during the course of reaction would exit the system, unless separate arrangements are made through recycling. It is expected that the recycling of light olefins would undergo further chain growth leading to more favorable middle distillates and liquid fuels production.

Hence, it is desirable to have reactor design configurations that are more uniform and simultaneously enhances the productivity and selectivity. It is believed that by devising the gas liquid contacting pattern, the reactor productivity and selectivity are greatly improved. This scheme also result's in much narrower product distribution.

OBJECTS OF THE INVENTION

The primary object of the invention is to develop an improved multistage reactor scheme for the synthesis of liquid hydrocarbon fuels based on Fischer Tropsch reaction.

Another object of the invention is to provide for a Fischer Tropsch reactor to carry out the counter-current multistage process Fischer Tropsch process for more even distribution of heat release.

SUMMARY OF THE INVENTION

Accordingly, the present invention relates to an improved multistage fischer tropsch reaction process for the production of hydrocarbon fuels comprising feeding gaseous phase syngas and liquid hydrocarbon streams in a counter current manner such as herein described into the reaction vessel at a number of stages containing reaction catalysts; wherein fresh syngas enters into the stage where the product liquid stream leaves and the fresh liquid stream enters into the stage where the unreacted syngas leaves; wherein further the temperature of each stage can be controlled independently.

In a preferred embodiment of the invention, number of the said stages is ≥2.

In another preferred embodiment of the invention the said reactant syngas flow is in counter-current direction and/or in a combination of counter and co-current directions to the said product liquid stream.

In yet another preferred embodiment of the invention the said syngas and/or liquid streams are optionally fed in one or more intermediate stages.

In yet another preferred embodiment of the invention, the said syngas and/or liquid streams of one/more stages are optionally split and/or mixed with syngas and/or liquid streams of other stages.

In a preferred embodiment of the invention, the said catalyst in liquid stream is in slurry and its concentration at each stage is between 5-50% (vol/vol).

In another preferred embodiment of the invention, the concentration of the said catalyst in liquid stream may vary in different reaction stages.

In a further embodiment of the invention, the said syngas and liquid streams entering a stage are substantially away from material equilibrium and are preferably away from thermal equilibrium.

The present invention also relates to an improved multistage fischer tropsch, reactor for the production of hydrocarbon fuels comprising reaction vessel(s) having separate inlets for feeding gaseous phase reactant syngas and liquid stream hydrocarbons in a counter current manner.

In a preferred embodiment the Fischer Tropsch reactor has ≥2 reaction vessels, connected to each other in series via connecting lines.

In another embodiment, the Fisher Tropsch reactor can be partitioned through baffles into ≥2 compartments.

In a further preferred embodiment, the temperature of each reaction vessel of the Fischer Tropsch reactor can be controlled independently.

In another embodiment, the gas or liquid stream temperatures can be controlled independently by exchanging heat with external sources.

In yet another preferred embodiment, the fresh syngas enters into the said reaction vessel stage where the product liquid stream leaves and the fresh liquid stream enters into the said reaction vessel where the unreacted syngas leaves.

BRIEF DESCRIPTION OF THE DRAWINGS

FIG. 1: The figure illustrates a simplified flow scheme of multi vessels suggested in the literature.

FIG. 2: The figure illustrates a simplified flow scheme of multi vessels for practicing the present invention.

FIG. 3: The figure illustrates an alternative flow scheme of multistage Fischer Tropsch reaction practicing the present invention.

FIG. 4: The figure illustrates another flow scheme of multistage Fischer Tropsch reaction practicing the present invention.

DETAILED DESCRIPTION OF THE INVENTION

Figure 5:
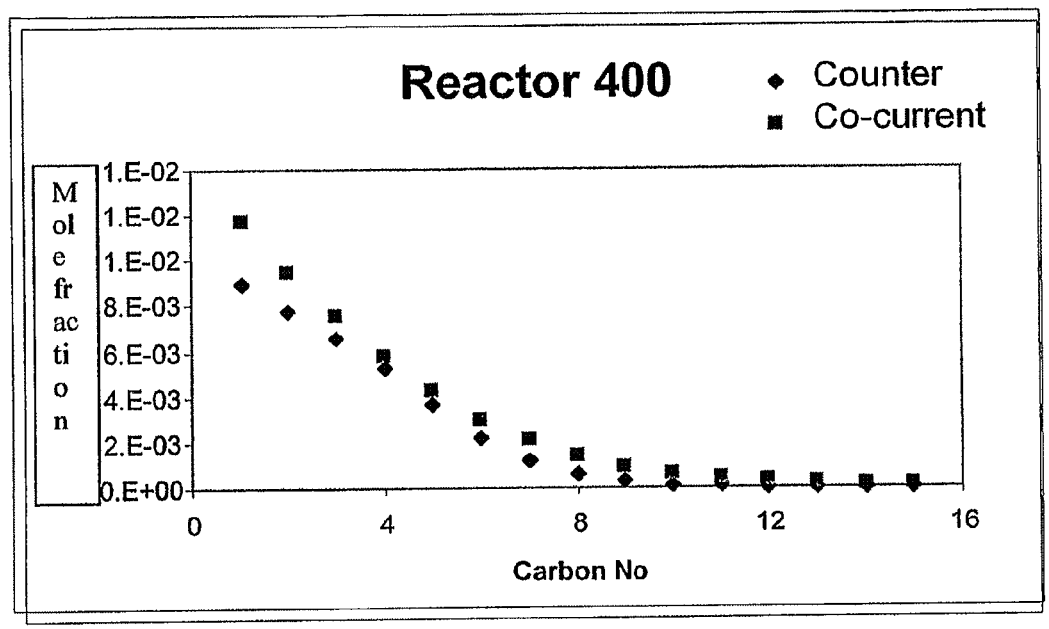
FIG. 5: The figure illustrates the concentration of unconverted gaseous in co-current and counter-current schemes.

The present invention is directed at a process for producing long chain hydrocarbon molecules from carbon monoxide and hydrogen by FT synthesis. The process consists of feeding carbon monoxide and hydrogen into a reaction vessel containing suitable catalysts. The process is carried out in a number of stages (preferably in 2 to 5) in series with the gaseous reactants and product liquid flowing in counter-current direction. In counter-current scheme disclosed herein the fresh synthesis gas (hereinafter also referred to as "syngas") enters into a stage from where product liquid is withdrawn. Similarly, fresh liquid stream enters into a stage from where unreacted synthesis gas exits. The key feature of this scheme and design is that the light olefin content is maximized inside the reactor section and it also distributes the heat load more uniformly. As light olefins are the crucial for chain growth the reactor productivity and selectivity also improve.

A process for increasing the olefins concentrations and thereby improving the chain growth in the Fisher-Tropsch (FT) reactors system is disclosed in the present invention. The process of the invention also aids in attaining more even distribution of energy release in the individual reactors or sections. As per the present methodology synthesis gas, consisting of predominantly $H_2$ and CO, is contacted in two or more stages with FT hydrocarbon liquid stream; flowing in countercurrent direction or a combination of counter and co-current flows to the FT product liquid stream. Due to the counter flow, majority of the volatile hydrocarbon fractions (rich in olefins) are transferred to the incoming synthesis gas from the exiting FT liquid, thus reducing the reactor temperature. Similarly, incoming liquid stream absorbs light hydrocarbon fraction from the exiting un-reacted synthesis gas. Therefore, the methodology provides higher overall olefin content in the reactant streams leading to improved reactor productivity and selectivity for middle distillates.

FIG. 1 presents the prior art FT process scheme described in Maretto et al., (1998) considering three reactors in series. As illustrated FIG. 1, the fresh gaseous, feed stream 1, along with liquid hydrocarbon stream 5 enters the reaction vessel 200 where it reacts in the presence of suitable catalysts to produce liquid hydrocarbons. All the reaction vessels 200, 300 and 400 contain suitable catalysts wherein Fischer Tropsch reaction takes place. The feed liquid stream 5 preferably contains $C_{16}+$ hydrocarbons. Gaseous and liquid effluents of vessel 200 i.e. streams 2 and 6 are fed to vessel 300 through line 2 and 6. While the effluents of vessel 300 i.e. streams 3 and 7 are fed to vessel 400 through line 3 and 7. Finally product liquid stream 8 and unconverted gases stream 4 exits from unit 400. During the discussion this scheme is referred as co-current scheme. In the above the scheme has been illustrated for a three reactor configuration. However, it can be extended to as many reactors while the minimum number of reactors at least being 2. In this scheme no special efforts are made to improve the olefin content in the gas phase and even distribution of heat among the reactors.

The present invention discloses a methodology for even distribution of reaction heat among the reactors and maximizing the olefin concentration in the reactors. The invention is about arranging the flow patterns of gas and liquid streams. The methodology is based on the concept of contacting olefin rich liquid stream with relatively leaner gas stream and olefin rich gas stream with relatively leaner liquid stream, so that vaporization or condensation of olefins occurs due to the concentration gradient. Such a scheme would lead to more uniformly distributed heat loads and higher olefins concentration while the FT reactions are carried out in series.

Referring to FIG. 2, the fresh gaseous feed stream 1 enters the reaction vessel 200 where it reacts in the presence of suitable catalysts to produce liquid hydrocarbon. A liquid hydrocarbon stream 5 preferably containing $C_{16}+$ hydrocarbons enters the system through reaction vessel 400. The reaction vessels 200, 300 and 400 contain suitable catalysts wherein Fischer-Tropsch reaction takes place. Gaseous effluents of vessel 200 are fed to vessel 300 through line 2 and gaseous effluents of vessel 300 are fed to vessel 400 through line 3. Whereas liquid effluent of vessel 400 is fed to vessel 300 through line 6 and liquid effluents of vessel 300 is fed to vessel 200 through line 7. Line 4 represents the gaseous effluents leaving the whole system whereas line 8 represents product liquid leaving the system. This scheme is referred as counter-current scheme in the discussions.

The high conversions are associated with higher amounts of heat release in an exothermic reaction. When FT reaction is carried out in series, the first stage gas conversions are higher and hence the heat release. When gas and liquid stream flow in co-current fashion, the amount of olefin vaporization is limited to the available olefin content in the liquid phase. Whereas in counter-current scheme of the FT process, when gas and liquid flows, the olefin rich liquid stream 7 meets the entering fresh gas 1 which is free of light olefins. This scheme of stream flow in a FT reactor strips the olefins from the exiting liquid stream 8. This achieves two purposes, firstly the higher amount of vaporization results in cooling of the reactor so that the load on the exchanger is reduced. Secondly, the olefin rich liquid stream is stripped off light olefins and is efficiently kept within the system without any additional effort.

Similarly, the fresh liquid stream along with the catalyst enters into the reactor 400 from where the unconverted gas stream 4 exits. The olefins from the incoming gas stream 3 are efficiently absorbed into the liquid stream due to concentration difference. Typically, the conversions in the last stages are much lower than the first stage and hence the heat release. In co-current scheme, the heat release in final stages is substantially lower than the initial stages. However, in the counter-current scheme, the heat load is closer to the initial stages due to latent heat of absorption. The concept has been illustrated through a three reactor vessel configuration in series, while the same can be extended to multi reactor system in series or through placing suitable internals in a single reactor for creating segments.

In accordance with one preferred embodiment, the reactor scheme consists of at least two or more reactors in series. The fresh synthesis gas is contacted with exiting/product liquid stream and the liquid stream is contacted with exiting/unreacted syngas. Thus, the fresh liquid and fresh synthesis gas enter from opposite directions (as streams in counter-current). The concentration gradient allows transfer of light hydrocarbon fraction from the liquid to the gas phase while cooling the liquid stream advantageously.

Referring to FIG. 3, which depicts another embodiment of the present invention, the gaseous fresh feed stream 1 enters the reaction vessel 200 where it reacts in the presence of suitable catalysts to produce liquid hydrocarbon. A liquid hydrocarbon stream 5 preferably containing $C_{16}$+ hydrocarbons enters the system to the reaction vessel 400. The reaction vessels 200, 300 and 400 contain suitable catalysts wherein Fischer-Tropsch reaction takes place. Gaseous effluents of vessel 200 are fed to vessel 300 through line 2 and gaseous effluents of vessel 300 are fed to vessel 400 through line 3. Whereas liquid effluent of vessel 400 is fed to vessel 300 through line 6 and liquid effluents of vessel 300 is fed to vessel 200 through line 7. Line 4 represents the gaseous effluents leaving the whole system whereas line 8 represents product liquid leaving the system. Two additional optional streams, 9 (liquid) and 10 (gas) are fed to reactor 300. The envisaged purpose of these streams is to balance the feed supply and the loads on each reactor and controlling the selectivity. The concept is not limited to the illustrated three reactor vessel configuration; it can be extended to multi reactor system in series or a baffled reactor system.

Referring to FIG. 4, which elucidates yet another embodiment of the present invention, gaseous fresh feed stream 1 enters the reaction vessel 200 where it reacts in the presence of suitable catalysts to produce liquid hydrocarbon. Gaseous effluents of reactor 200 are split into two streams and are then fed to the reactors 300 and 400 through the lines 2 and 3, respectively. Lines 4 and 5 denote the gaseous effluents of the reactors 300 and 400 respectively. Fresh liquid 11 split into two parts (6 and 7) are fed to the reactors 300 and 400, respectively. Liquid effluents from reactor 300 and 400 are fed to reactor 200 through line 8 and 9. Liquid effluent of reactor 200 exits through line 10. In this scheme the light compounds generated spend less time in the reactor 200, so that the olefins saturation is minimized and higher residence time is provided in second stage i.e. reactors 300 and 400 so that chain growth is maximized.

A comparison of the co-current FT process scheme of prior art and counter-current FT process scheme of the present invention explains the following:

1. In the counter-current FT process scheme of the present invention substantial stripping of lighter hydrocarbons from the exiting product liquid through gas stream flowing in opposite direction takes place.
2. In the counter-current FT process scheme of the present invention there is substantial contribution to the heat removal through latent heat of vaporization of the lighter compounds.
3. In the counter-current FT process scheme of the present invention removal of lighter olefins from the exiting liquid stream takes place.
4. In the counter-current FT process scheme of the present invention there is contribution to the heat addition through latent heat of the condensation of lighter compounds.
5. The counter-current FT process scheme of the present invention is characterized by higher residence time for lighter olefins in the system compared to co-current schemes.
6. The counter-current FT process scheme of the present invention is characterized by higher liquid phase light olefins compared to co-current schemes of the prior art.
7. The counter-current FT process scheme of the present invention is characterized by more even distribution of heat compared to co-current schemes.
8. The counter-current FT process scheme of the present invention is characterized by higher probability for middle distillates production compared to co-current schemes.
9. The counter-current FT process scheme of the present invention is characterized by higher superficial gas velocity compared to co-current schemes.
10. The counter-current FT process scheme of the present invention is characterized by higher gas hold up compared to co-current schemes.
11. The counter-current FT process scheme of the present invention is has higher gas to liquid mass transfer co-efficient compared to co-current schemes.

The following examples describe preferred embodiments of the invention; further illustrating the benefits of the process and reactors schemes. The specific examples given herein, however, should not to be construed as forming the only genus that is considered as the invention, and any combination of the process or their steps may itself form a genus. Other embodiments within the scope of the claims herein will be apparent to one skilled in the art from consideration of the specification or practice of the invention as disclosed herein.

Example-1

Two reactor schemes one co-current (FIG. 1) and the other counter-current (FIG. 2) each having three reactors in series were designed and energy balance was made to estimate the heat removal requirement from each stage. The feed flow, composition, operating conditions and conversions considered are presented in Table-1.

TABLE 1

Comparison of feed flow, composition, operating conditions and conversions of co-current (FIG. 1) and the other counter-current (FIG. 1) FT reaction schemes

| Operating Conditions | |
|---|---|
| Temperature | 240° C. |
| Pressure | 30 bar |
| Composition of Inlet gas | $H_2$:CO: 2:1 |
|  | $N_2$: 5% |
| Gas Velocity | 4.1 m$^3$/s |
| Liquid Velocity | 0.38 m$^3$/s |
| Syngas conversion | |
| 1$^{st}$ stage | 38% |
| 2$^{nd}$ Stage | 71% |
| 3$^{rd}$ Stage | 92% |

|  | Cocurrent | Countercurrent |
|---|---|---|
| Heat removal (Gcal/hr) | | |
| I stage | 50.86 | 49.2 |
| II Stage | 47.97 | 44.2 |
| III stage | 32.63 | 37.3 |

TABLE 1-continued

Comparison of feed flow, composition, operating conditions and conversions of co-current (FIG. 1) and the other counter-current (FIG. 1) FT reaction schemes

| Gas Flows (kmol/hr) | | |
| --- | --- | --- |
| I stage | 8.62E+03 | 9.90E+03 |
| II Stage | 5.81E+03 | 8.06E+03 |
| III stage | 3.60E+03 | 3.94E+03 |

The FT liquid produced was calculated from the syngas conversion and the product distribution was estimated assuming the probability factor for chain growth (a) is 0.9. The heat released in each stage was computed based on heat balance with the product and un-reacted feed content.

Example-2

The composition calculations revealed that the counter current reaction scheme (FIG. 2) gas phase contains higher amount of light hydrocarbons as compared to co current scheme (FIG. 1). Gas phase compositions at different reactor outlets for co-current and counter current schemes are shown in Table 2. Results reveal that gas phase light hydrocarbon composition is higher for reactor 200 and 300 with counter current operation. In contrast the exiting gas contained lower lighters content with counter current operation. This confirms that more light hydrocarbons are absorbed by the incoming liquid. FIG. 5 shows the mole fraction of $C_2$-$C_{16}$ light olefins leaving the reactor 400 along with unconverted syngas (Stream 4). From the figure it is evident that the proposed invention captures the light olefin compounds more efficiently as compared to conventional co current process.

TABLE 2

| | Mole % of hydrocarbons in reactor gas phase effluents | | | | | |
| --- | --- | --- | --- | --- | --- | --- |
| Hydro- | Reactor-200 | | Reactor-300 | | Reactor-400 | |
| carbon range | Co-Current | Counter-Current | Co-Current | Counter-Current | Co-Current | Counter-Current |
| $C_1$-$C_2$ | 0.42 | 0.36 | 1.1 | 0.87 | 2.12 | 1.66 |
| $C_3$-$C_4$ | 0.30 | 0.39 | 0.76 | 0.85 | 1.32 | 1.18 |
| $C_5$-$C_8$ | 0.31 | 0.61 | 0.7 | 0.91 | 1.08 | 0.7 |
| $C_9$-$C_{16}$ | 1.48 | 1.6 | 1.69 | 1.78 | 1.9 | 1.8 |
| CO, $CO_2$, $H_2O$, $H_2$ | Balance | Balance | Balance | Balance | Balance | Balance |

Main Advantages of the Invention

1. The improved Fischer Tropsch reaction process and system of the present invention increases olefins concentrations and thereby improving the hydrocarbon chain growth in the Fischer tropsch reactors; and is therefore more efficient than the prior art processes and reactors.
2. The Fischer Tropsch reaction process of the present invention also aids in attaining more even distribution of energy release in the individual reactors at various stages.
3. The Fischer Tropsch reaction process and system of the present invention enhances product selectively,
4. The Fischer Tropsch reaction process and system of the present invention increases reactor productivity.

We claim:

1. A multistage fischer tropsch reaction process for the production of hydrocarbon fuels in slurry reactor comprising feeding gaseous phase syngas and liquid stream hydrocarbons in a counter current manner into the reaction vessel at a number of stages containing reaction catalysts; wherein fresh syngas enters into the stage where the product liquid stream leaves and the fresh liquid stream enters into the stage where the unreacted syngas leaves so that net gas flow is counter current to net liquid flow; wherein the temperature of each stage can be controlled independently.

2. The process as claimed in claim 1, wherein number of the stages are ≥2.

3. The process as claimed in claim 1, wherein the reactant syngas flow in a counter-current direction and/or in a combination of counter and co-current directions to the product liquid stream.

4. The process as claimed in claim 1, wherein the syngas and/or liquid streams are optionally fed in one or more intermediate stages.

5. The process as claimed in claim 1, wherein the syngas and/or liquid streams of one/more stages are optionally split and/or mixed with syngas and/or liquid streams of other stages.

6. The process as claimed in claim 1 wherein the catalyst in liquid stream is in slurry and its concentration at each stage is between 5-50% (vol/vol).

7. The process as claimed in claim 6, wherein concentration of the catalyst in liquid stream may vary in different reaction stages.

8. The process as claimed in claim 1, wherein the syngas and liquid streams entering a stage are substantially away from material equilibrium.

9. The process as claimed in claim 8, wherein the syngas and liquid streams entering a stage are substantially away from material equilibrium and away from thermal equilibrium.

* * * * *